US009394592B2

(12) United States Patent
Konyashin et al.

(10) Patent No.: US 9,394,592 B2
(45) Date of Patent: Jul. 19, 2016

(54) HARD-METAL BODY (71) Applicant: Element Six GmbH, London (GB)

(72) Inventors: Igor Yuri Konyashin, Burghaun (DE); Sebastian Ralf Hlawatschek, Burghaun (DE); Bernd Heinrich Ries, Burghaun (DE); Frank Friedrich Lachmann, Burghaun (DE)

(73) Assignee: ELEMENT SIX GMBH (DE)

( * ) Notice: Subject to any disclaimer, the term of this patent is extended or adjusted under 35 U.S.C. 154(b) by 122 days.

(21) Appl. No.: 14/147,069

(22) Filed: Jan. 3, 2014

(65) Prior Publication Data

US 2014/0115974 A1 May 1, 2014

Related U.S. Application Data (60) Continuation of application No. 13/412,836, filed on Mar. 6, 2012, now abandoned, which is a division of application No. 13/203,976, filed as application No. PCT/IB2010/050868 on Mar. 1, 2010.

(30) Foreign Application Priority Data

Feb. 27, 2009 (GB) .................................. 0903343.2

(51) Int. Cl.
*B24D 3/02* (2006.01)
*C22C 29/12* (2006.01)
(Continued)

(52) U.S. Cl.
CPC .............. *C22C 32/0052* (2013.01); *B22F 3/101* (2013.01); *B22F 3/1035* (2013.01); *B23B 27/148* (2013.01); *B24D 3/001* (2013.01); *C22C 29/08* (2013.01)

(58) Field of Classification Search
CPC ...... B22F 3/101; B22F 3/1035; B23B 27/148; C22C 29/08; C22C 32/0052
USPC .......................... 51/309; 75/232, 236; 419/38
See application file for complete search history.

(56) References Cited

U.S. PATENT DOCUMENTS 4,743,515 A    5/1988   Fischer et al.
4,820,482 A    4/1989   Fischer et al.
(Continued)

FOREIGN PATENT DOCUMENTS

EP    0385316 A3    4/1991
EP    0629713 A2    12/1994
(Continued)

OTHER PUBLICATIONS

Mari et al., Measurement of residual thermal stress in WC—Co by neutron diffraction, International Journal of Refractory Metals & Hard Materials, 2009, 282-287, 27.
(Continued)

*Primary Examiner* — Shuangyi Abu Ali
(74) *Attorney, Agent, or Firm* — Bryan Cave LLP (57) ABSTRACT The invention relates to hard-metal body comprising a hard-metal, the hard-metal comprising tungsten carbide grains and metal binder comprising cobalt having a concentration of tungsten dissolved therein, the body comprising a surface region adjacent a surface and a core region remote from the surface, the surface region and the core region being contiguous with each other; the mean binder fraction of the core region being greater than that of the surface region; the mean carbon concentration within the binder being higher in the surface region than in the core region; to tools comprising same and methods of making same.

3 Claims, 5 Drawing Sheets (51) Int. Cl.

| | |
|---|---|
| *C22C 29/02* | (2006.01) |
| *B22F 1/00* | (2006.01) |
| *B22F 1/02* | (2006.01) |
| *C22C 32/00* | (2006.01) |
| *B22F 3/10* | (2006.01) |
| *C22C 29/08* | (2006.01) |
| *B23B 27/14* | (2006.01) |
| *B24D 3/00* | (2006.01) |

(56) References Cited

U.S. PATENT DOCUMENTS

| | | | |
|---|---|---|---|
| 5,066,553 | A | 11/1991 | Yoshimura et al. |
| 5,116,416 | A | 5/1992 | Knox et al. |
| 5,181,953 | A | 1/1993 | Nakano et al. |
| 5,283,030 | A | 2/1994 | Nakano et al. |
| 5,312,653 | A | 5/1994 | Buchanan |
| 5,541,006 | A | 7/1996 | Conley |
| 5,594,931 | A | 1/1997 | Krall et al. |
| 5,623,723 | A | 4/1997 | Greenfield |
| 5,624,068 | A | 4/1997 | Waldenstrom et al. |
| 5,648,119 | A | 7/1997 | Grab et al. |
| 5,856,626 | A | 1/1999 | Fischer et al. |
| 6,066,553 | A | 5/2000 | Sandhu et al. |
| 6,135,218 | A | 10/2000 | Deane et al. |
| 6,368,377 | B1 | 4/2002 | Bryant et al. |
| 6,478,887 | B1 | 11/2002 | Sue et al. |
| 6,869,460 | B1 | 3/2005 | Bennett et al. |
| 6,878,181 | B2 | 4/2005 | Carpenter |
| 7,282,079 | B2 | 10/2007 | Mizuno et al. |
| 7,288,132 | B2 | 10/2007 | Chun et al. |
| 7,431,566 | B2 | 10/2008 | Gray et al. |
| 7,438,741 | B1 | 10/2008 | Bangaru et al. |
| 7,475,743 | B2 | 1/2009 | Liang et al. |
| 2005/0147850 | A1 | 7/2005 | Tillman et al. |
| 2005/0276717 | A1 | 12/2005 | Fang |
| 2007/0089913 | A1 | 4/2007 | Desai et al. |
| 2008/0240879 | A1 | 10/2008 | Dourfaye et al. |
| 2009/0117372 | A1 | 5/2009 | Zhuk et al. |

FOREIGN PATENT DOCUMENTS

| | | |
|---|---|---|
| EP | 1548136 B1 | 3/2008 |
| EP | 1932930 A1 | 6/2008 |
| GB | 1506915 | 5/1978 |
| JP | 5867803 | 5/1983 |
| JP | 5873762 | 5/1983 |
| JP | 02209448 A | 8/1990 |
| JP | 10298700 | 11/1998 |
| JP | 2000144301 A | 5/2000 |
| JP | 2002029845 A | 1/2002 |
| JP | 2005298902 A | 10/2005 |
| WO | 2005/056854 A1 | 6/2005 |
| WO | 2010/056191 A1 | 5/2010 |
| WO | 2010/062649 A2 | 6/2010 |

OTHER PUBLICATIONS

Roebuck, Magnetic Moment (Saturation) Measurements on Hardmetals, International Journal of Refractory Metals & Hard Materials, 1996, 419-424, 14.
International Search Report for PCT/IB2010/050868 dated Jun. 9, 2010.
Zou, "The mass transport of Co—phase in cemented carbide during sintering", HM & HM, vol. 1, Apr. 1, 1993, p. 24.
Brookes, "World directory and handbook of hardmetals and hard materials", Sixth Edition, International Carbide Data, 1996.
Voigt, et al., "Investigations into the binder metal composition of tungsten carbide/cobalt hard metals" Neue Hutte, vol. 19/2, 1974 (including English translation).
Collin, et al., "Hardness gradients in WC—Co created by local addition of Cr3C2", International Plansee Seminar 2005, Proceeds, vol. 2, 2005, p. 227.
Sandvik Coromant,"Modern metal cutting—a practical handbook", AB Sandvik Coromant, 1994.
Opposition against European Patent No. EP 2 401 099 B1 (Appl. No. 10 714 684.7) submitted by Plansee Group Service GmbH, dated Jun. 23, 2014.
Reply of Feb. 2, 2015 to Communication of Notice of Opposition of European Patent No. EP 2 401 099 B1 (Appl. No. 10 714 684.7) submitted by Element Six GmbH, dated Aug. 1, 2014.
Notice of Opposition—Facts and Arguments by Opponent Sandvik Intellectual Property AB for Opposition of European Patent No. EP 2 401 099 B1 (Appl. No. 10 714 684.7), dated Jun. 24, 2014.

HARD-METAL BODY

FIELD

This invention relates to hard-metal bodies and in particular to cobalt-based tungsten carbide hard-metal bodies, tools including such hard-metal bodies and methods of making such hard-metal bodies.

BACKGROUND

As used herein, a hard-metal is a material comprising grains of metal carbide such as tungsten carbide (WC) or titanium carbide (TiC), dispersed within a binder phase comprising a metal such as cobalt (Co), nickel (Ni) or metal alloy. The binder phase may be said to cement the grains together as a sintered compact, typically having negligible porosity. The most common hard-metal is Co-cemented WC.

Hard-metals are used in a wide variety of applications, particularly in applications where a tool needs to be resistant against wear and other mechanical degradation. Examples of such applications include tools for machining, cutting, drilling or otherwise mechanically forming or degrading a workpiece or other body. Hard-metal inserts are widely used for machining metals and abrasive materials, or as tools for mechanical picks for degrading pavements, asphalt or rock formations, or as inserts for drill bits for earth and rock boring in the oil and gas industry, as well as protective parts potentially subject high rates of mechanical wear in use, known as wear parts. Hard-metals used in these kinds of applications may be subjected to high impact loads, intensive wear, severe fatigue, high temperatures and strong thermal shocks in use, and are typically engineered to possess an outstanding combination of hardness and fracture toughness, as well as associated properties of high strength and abrasion resistance. Typically, abrasion resistance is positively correlated with hardness. Hard-metals are also used as supporting substrates for polycrystalline diamond (PCD) and polycrystalline cubic boron nitride (PCBN) elements, to which they are typically integrally bonded during a sintering step carried out at an ultra-high pressure, which is understood to mean a pressure greater than about 2 GPa.

The hardness and toughness of a type of hard-metal can be determined by selecting particularly the mean carbide grain size, the binder content and the carbon content within the binder. Unfortunately, hardness and toughness tend to be favoured by different sets of content and microstructure, and conventionally the one can only be increased at the expense of the other.

In a publication entitled "Measurement of residual thermal stress in WC—Co by neutron diffraction" (Mari, D. and B. Clausen in The International Journal of Refractory and Hard Materials, volume 27 of 2009, pages 282 to 287) it is disclosed that the residual stress in the binder phase of the surface region of conventional hard materials may be up to 1,850 MPa or even to 2,000 MPa.

The content of Co binder and C within Co-cemented WC hard-metals can be determined by selection of the starting powders. The C content within the binder can be decreased by adding W metal or increased by adding carbon black. The mean size of the WC grains can be controlled by introducing a known grain growth inhibitor or by limiting the amount of carbon present, which directly influences the amount of W dissolved in the binder. A disadvantage of the first approach may be that grain growth inhibitors reduce the toughness of the hard-metal. A disadvantage of the second approach may be that carbon content must be as low as possible within the two-phase range of WC—Co, which is technically difficult, since low carbon content may result in the formation of brittle eta-phases, which would also reduce the toughness.

United Kingdom patent number GB1506915 discloses the discovery that it is possible to make a cemented carbide body containing a binder metal and one or more hard metal carbides, with a thin wear-resistant surface layer by treating the body with carbon monoxide. It further discloses a cutting tool comprising such a body, wherein the concentration of carbide is greater than that within the remainder of the body and decreasing from the exterior of said layer towards the interior.

Hard-metal bodies having graded structure and properties within a region may be made by introducing a grain growth inhibitor locally, thereby locally limiting the mean size of the carbide grains. For example, U.S. Pat. No. 5,623,723 discloses a method for making a graded Co-cemented WC hard-metal by heat treating a green body (i.e. a body comprising the constituents of a hard-metal, but not yet sintered) in contact with a source of grain growth inhibitor. European patent number 1 548 136 discloses a cemented carbide wherein the grain size of the carbide within a surface portion is smaller than that within an interior portion, the binder content being lower within the surface portion than in the interior portion.

Normally, the microstructure of conventional WC—Co hard-metals must be two-phase comprising only the WC phase and the binder phase. However, as a result of decarburisation, additional phases, which are generally designated in the literature as "eta-phases" may form.

U.S. Pat. No. 4,820,482 discloses a method for making a body having varying binder phase content and substantially no eta-phase by carburising a WC-containing body having sub-stoichiometric carbon content. As a result of the carburising treatment, a body is obtained comprising a low content of binder phase in the surface zone (possibly along with small amounts of free graphite) and a high content of binder phase in the centre.

U.S. Pat. Nos. 4,743,515 and 5,856,626 disclose a graded Co-cemented WC hard-metal comprising at least two regions, a surface region and a core region, wherein the surface region is substantially devoid of eta-phase and the core region contains eta-phase. United States patent application publication number 20080240879 discusses that the method in U.S. Pat. No. 4,743,515 has the disadvantage that it results in a binder phase gradient that is rich in cobalt over one or two millimeters, while the core of the hard-metal remains fragile because it is constituted by the eta-phase and can easily crack during repeated impacts.

U.S. Pat. No. 5,066,553 discloses a surface-coated tool member of WC-based cemented carbide which has a hard coating formed on a substrate. The cobalt content of the substrate in a surface portion of depth about 2 microns is less than that at a depth of about 100 microns by at least 10 percent.

United States patent application publication number 20050147850 discloses a cemented carbide body comprising WC and a Co or Ni binder phase with a nominal binder phase content of 4 to 25 weight percent, and a surface portion and an interior portion. The surface portion has a binder phase content less than 0.9 of the binder phase content in the interior portion.

Japan patent number 02209448A discloses an ultra-hard alloy comprising WC and a bonding phase of iron-group metal, the content of a bonding phase in a surface region being less than that in the interior, resulting in residual stress in the surface region. Segregation of bonding phase into the interior may be achieved by a method including repeated carburisation and decarburisation of a packed powder pre-form.

SUMMARY

The purpose of the invention is to provide hard-metals with graded properties in which the surface region has enhanced wear resistance and toughness.

As used herein, the term "metal" means a metal in elemental form or an alloy having typical metallic properties, such as electrical conductivity.

As used herein, the term "binder fraction" means the ratio of the mean weight of binder per unit volume to the mean weight of hard-metal per unit volume within a body or portion thereof.

As used herein, the phrase "substantially devoid of" means that if an amount of a certain material, substance or phase is detectable within a hard-metal body, the amount is so small that it has no material discernible effect on the performance of the hard-metal body at elevated temperatures, for example 700 to 800 degrees centigrade.

As used herein, the magnetic moment a of a material is in units of micro-Tesla times cubic meter per kilogram of the material. The magnetic saturation of the material is obtained from the magnetic moment by multiplying it by $4\pi$.

The invention provides a hard-metal body comprising a hard-metal, the hard-metal comprising tungsten carbide grains and metal binder comprising cobalt having a concentration of tungsten dissolved therein, the body comprising a surface region adjacent a surface and a core region remote from the surface, the surface region and the core region being contiguous with each other; the mean binder fraction of the core region being greater than that of the surface region; the mean carbon concentration within the binder being higher in the surface region than in the core region; and the mean magnetic moment of the hard-metal in the surface region being greater than that in the core region; the hard-metal body being substantially devoid of eta-phase and free carbon; and the concentration in weight percent of tungsten dissolved in the binder in the surface region being less than that in the core region, the concentration in weight percent of tungsten dissolved in the binder being determined as $(16.1-\sigma_B)/0.275$; $\sigma_B$ being the magnetic moment of the hard-metal within a region of the hard-metal body divided by the binder weight fraction in the region.

In one embodiment of a hard-metal body, the mean magnetic moment of the hard-metal in units of micro-Tesla times cubic meter per kilogram of the material is in the range from 0.131X to 0.161X within the surface region, in one embodiment between 0.140X and 0.161X, and in the range from 0.110Y to 0.147Y within the core region, in one embodiment from 0.110Y to 0.140Y, X and Y being respectively the weight percent of the cobalt within the surface and core regions; both X and Y being at least about 1 weight percent and at most about 50 weight percent. The concentration in weight percent of tungsten dissolved in the binder is $(16.1-\sigma_B)/0.275$, where $\sigma_B$ is the magnetic moment of the binder material, obtained by dividing the magnetic moment a of the hard-metal by the binder weight fraction in the hard-metal.

In one embodiment, the concentration of tungsten dissolved in the binder within the surface region is less than about 7.6 weight percent. In one embodiment, the concentration of tungsten dissolved in the binder within the core region is about 7.6 weight percent.

Embodiments of the invention have the advantage of providing a desired gradient of properties while avoiding the deleterious effect on the properties of the hard-metal that are associated with too little carbon on the one hand (i.e. the formation of eta-phase) and free carbon (i.e. reduction in hardness and fracture toughness) on the other.

In one embodiment, the surface region is a layer or stratum integrally formed with the core region. In some embodiments, the surface region has thickness of at most about 10 mm or at most about 5 mm. In some embodiments, the surface region has thickness of at least about 0.5 mm or at least about 1 mm. In one embodiment, the surface region has thickness within the range from 0.5 mm to 10 mm.

Embodiments of the invention have an extended working life in high wear applications resulting from a thick surface layer having enhanced wear resistance.

In some embodiments, the core region has a maximum depth from the surface of at least about 0.5 mm, at least about 1 mm or at least about 2 mm. In some embodiments, the core region has a maximum depth from the surface of at most about 15 mm, at most about 10 mm or at most about 5 mm. In one embodiment, the core region has a maximum depth from the surface in the range from 2 mm to 5 mm.

As used herein, the term "fracture toughness" means the $K_{1C}$ value, typically in units of MPa·m$^{1/2}$, measured by the Palmquist method, which is well known in the art. As used herein, the hardness-toughness coefficient of a material is obtained by multiplying the Vickers hardness of the material, in units of "Vickers pyramid numbers", by the fracture toughness, in units of MPa·m$^{1/2}$.

In one embodiment, the hardness-toughness coefficient of the surface region is substantially greater than the hardness-toughness coefficient of the core region, and in one embodiment, the hardness-toughness coefficient of the surface region is at least about 20,000 in units of Vickers hardness times MPa·m$^{1/2}$.

Embodiments of the invention have the advantage of having a surface region having an unexpectedly good combination of high hardness and high fracture toughness, which may dramatically prolong the working lives of tools comprising embodiments of invention, as may be used in the degrading of pavement and asphalt, boring into rock and mining.

In one embodiment, the surface region comprises binder phase in a state of residual stress in the range from about −500 MPa to about +300 MPa. In one embodiment, the surface region comprises binder phase in a state of residual compressive stress in the range from about −500 MPa to about 0 MPa. In another embodiment, the surface region comprises binder phase in a state of residual tensile stress in the range from about 0 MPa to about 300 MPa.

In one embodiment, the mean binder fraction within the surface region is lower than that within the core region by a factor of at least about 0.05. In one embodiment, the mean metal binder fraction within the surface region is lower than that within the core region by a factor of at most about 0.90.

In one embodiment, the mean grain size of the metal carbide grains within the core region is within 5 percent of that within the surface region. In one embodiment, the mean grain size of the metal carbide grains within the core region is higher than that within the surface region.

In one embodiment, the surface region is substantially devoid of grain growth inhibitors or their precursors, particularly chromium or vanadium or their carbides.

Embodiments of the invention have the advantage that grain growth inhibitors are not present, which will avoid the deleterious effect of grain growth inhibitors on certain properties of the hard-metal, especially the fracture toughness.

In one embodiment, the metal binder is based on cobalt and nickel. As used herein, the term "based on" is understood to mean "comprises". In one embodiment, the metal binder comprises cobalt and the metal carbide is tungsten carbide. In one embodiment, the metal binder comprises up to 40 weight percent iron.

In one embodiment, the mean magnetic coercivity, $H_c$, of the hard-metal within the core region is within 5 percent of that within the surface region. In one embodiment, the mean magnetic coercivity, $H_c$, of the hard-metal within the core region is higher than that within the surface region.

In one embodiment, the mean hardness of the hard-metal within the surface region is within the range from 2 percent to 50 percent higher than the mean hardness of the hard-metal within the core region.

In one embodiment, the metal binder fraction within the surface region increases monotonically with depth from the surface over any range of depths within the surface region and the hardness within the surface region decreases monotonically with depth from the surface over any range of depths within the surface region. The term "monotonically" means that the curve is substantially smooth.

In some embodiments, the hard-metal comprises a concentration of Cr, V, Ta, Ti, Nb, Zr, Hf or Mo in carbide form or in solid solution within the metal binder. In some embodiments, the concentration is at most about 2 weight percent at most about 0.5 weight percent, or at most about 0.3 weight percent. In one embodiment, the concentration of Cr, V, Ta, Ti, Nb, Zr, Hf or Mo in carbide form or in solid solution within the binder preferably is substantially uniformly distributed throughout the surface and core regions.

A second aspect of the invention provides a tool insert for cutting, machining, drilling or otherwise forming or degrading a workpiece or other body, the tool insert comprising an embodiment of a hard-metal body according to the first aspect of the invention.

In one embodiment the tool insert comprises a polycrystalline diamond (PCD) or a polycrystalline cubic boron nitride (PCBN) structure joined to the hard-metal body.

A third aspect of the invention provides a tool comprising an embodiment of the tool insert according to the second aspect of the invention. Embodiments of the tool are suitable for use in drilling, cutting or degrading stone, asphalt and concrete.

A fourth aspect of the invention provides an assembly for wear applications, the assembly comprising an embodiment of a tool insert according to the present invention.

In some embodiments, the hard-metal body is joined to a polycrystalline diamond (PCD) or a polycrystalline cubic boron nitride (PCBN) structure. In some embodiments, the PCD or PCBN structure is integrally bonded to the hard-metal body during a sintering step carried out at a pressure of at least about 5 GPa.

As used herein, a green body means an article intended to be sintered, but which has not yet been sintered. It may generally be self-supporting and may have the general form of the intended finished article. As used herein, a pre-sintered body means an article that has undergone heat treatment and is partially or incompletely sintered, and which is intended to be further sintered.

A fifth aspect of the present invention provides a method of making a hard-metal body according to the invention, the method including providing an unsintered green body comprising grains of metal carbide dispersed within a metal binder, and a carbon content in the range from 95 percent to 99 percent of the stoichiometric content of carbon in the presence of the hard-metal in the metal binder; pre-sintering the green body at a temperature in the range from 1,000 to 1,280 degrees centigrade for a period of time in the range from 1 hour to 3 hours in a vacuum or inert atmosphere to form a pre-sintered body, the temperature being sufficiently low to avoid substantial melting of the metal binder and the temperature and time being sufficient to maintain open porosity within the surface region of green body; heat-treating the pre-sintered body in a carbon-containing atmosphere to form a carburised surface region having a carbon content in the range from 101 percent to 105 of the stoichiometric content; and liquid-phase sintering the pre-sintered body at a temperature in the range from 1,320 degrees centigrade to 1,400 degrees centigrade.

In embodiments of the method, the desired open porosity is formed by pre-sintering heat treatment of the green body at a temperature (from about 1,000 to about 1,280 degrees centigrade) for a period of time in a vacuum or inert atmosphere, the temperature being sufficiently low to avoid the substantial melting of the metal binder and the temperature and time being sufficient to achieve a desired open porosity within the green body.

In an embodiment of the method, carbon is introduced into the surface region of the green body by heat treating the porous green body at a temperature for a period of time in an atmosphere comprising a carbon-containing gas, the temperature being sufficiently low to avoid substantial melting of the metal binder, and the combination of temperature and time being sufficiently great to achieve carburisation within the core region, and sufficiently low to avoid excessive carbon content in the surface region. Excessive carbon content may result in free carbon within the binder, which may have a deleterious effect on mechanical properties.

In one embodiment, the method includes providing an unsintered green body comprising grains of metal carbide dispersed within a metal binder, and a carbon content in the range from about 95 percent to about 99 percent of the stoichiometric content; sintering the green body at a temperature in the range from about 1,000 to about 1,280 degrees centigrade for a period of time in the range from about 1 hour to about 3 hours in a vacuum or inert atmosphere to form a pre-sintered body, the temperature being sufficiently low to avoid substantial melting of the metal binder and the temperature and time being sufficient to maintain open porosity within the surface region of green body; heat-treating the pre-sintered body in a carbon-containing atmosphere to form a carburised surface region having a carbon content in the range from 101 percent to 105 of the stoichiometric content; and liquid-phase sintering the pre-sintered body at a temperature in the range from about 1,320 degrees centigrade to about 1,400 degrees centigrade. The initial low carbon content may be maintained within at least a portion of the core region at temperatures equal to or lower than about 1,100 degrees centigrade.

DRAWINGS

Non-limiting preferred embodiments will now be described with reference to the drawings, of which.

DETAILED DESCRIPTION OF EMBODIMENTS

Figure 1:
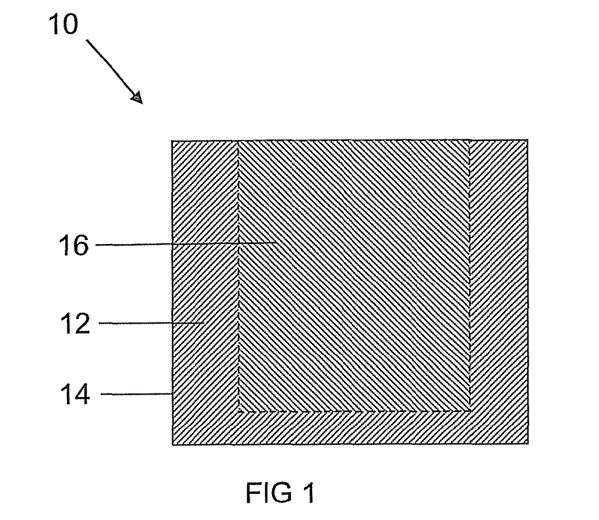
FIG. 1 shows a schematic cross section view of an embodiment of a hard-metal body.

With reference to FIG. 1, an embodiment of a hard-metal body 10 comprises a hard metal comprising metal carbide grains (not shown) and cobalt metal binder (not shown), the body 10 comprising a surface region 12 proximate a surface 14 and a core region 16 remote from the surface 14, the surface region 12 and the core region 16 being contiguous with each other, the mean binder fraction of the core region 16 being greater than that of the surface region 12; the mean carbon concentration within the binder being higher in the surface region 12 than in the core region 16; and the mean magnetic moment of the hard-metal being in the range from 0.131X to 0.161X within the surface region 12, and in the range from 0.110Y to 0.147Y within the core region 16, X and Y being respectively the weight percent of the cobalt within the surface and core regions; both X and Y being at least about 1 weight percent and at most about 50 weight percent.

Figure 2A:
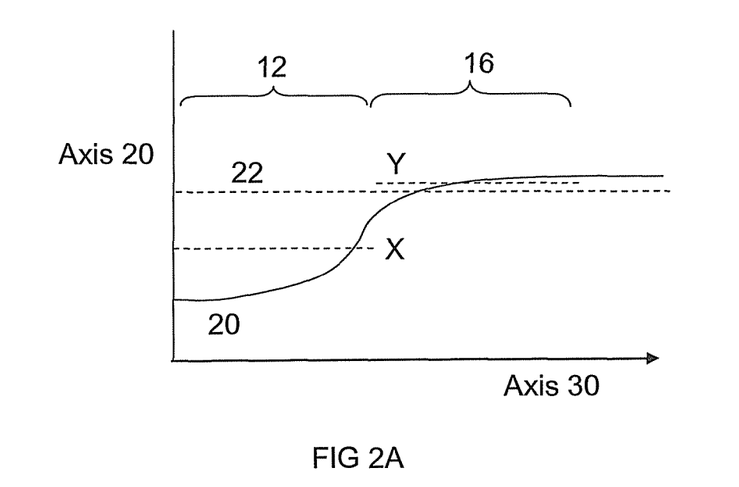
FIG. 2A shows a schematic graph of the binder content within an embodiment of a hard-metal body as a function of depth from a surface.

With reference to FIG. 2A, the cobalt binder fraction 20 of an embodiment of a hard-metal body is plotted on a schematic graph of cobalt content Axis 20 versus depth from a surface Axis 30 of the body. The cobalt binder fraction 20 increases monotonically with depth from the surface Axis 30 of the hard-metal body having a mean cobalt binder fraction 22 through a surface region 12 and a core region 16. The mean cobalt binder fraction X within the surface region is less than the mean cobalt binder fraction 22 of the body and the mean cobalt binder fraction Y in the core region 16 is greater than the mean cobalt binder fraction 22 of the body. The values of cobalt fractions X and Y depend on the grade of hard-metal, which is typically selected according to the intended application, as would be appreciated by the person skilled in the art.

Figure 2B:
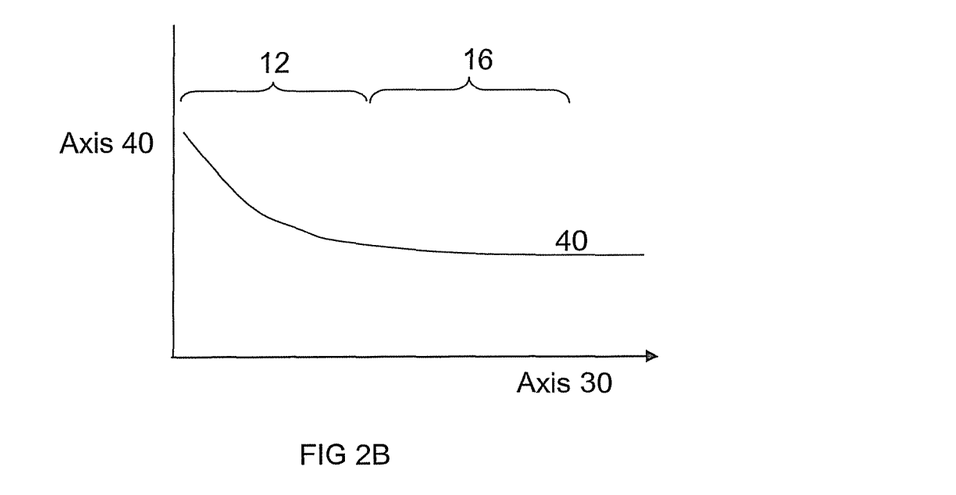
FIG. 2B shows a schematic graph of the hardness an embodiment of a hard-metal body as a function of depth from a surface.

With reference to FIG. 2B, the hardness 40 of an embodiment of a hard-metal body is plotted on a schematic graph of hardness Axis 40 versus depth from a surface Axis 30 of the body. The hardness 40 decreases with increasing depth Axis 30 from the surface, the mean hardness being greater within the surface region 12 than in the core region 16.

Figure 2C:
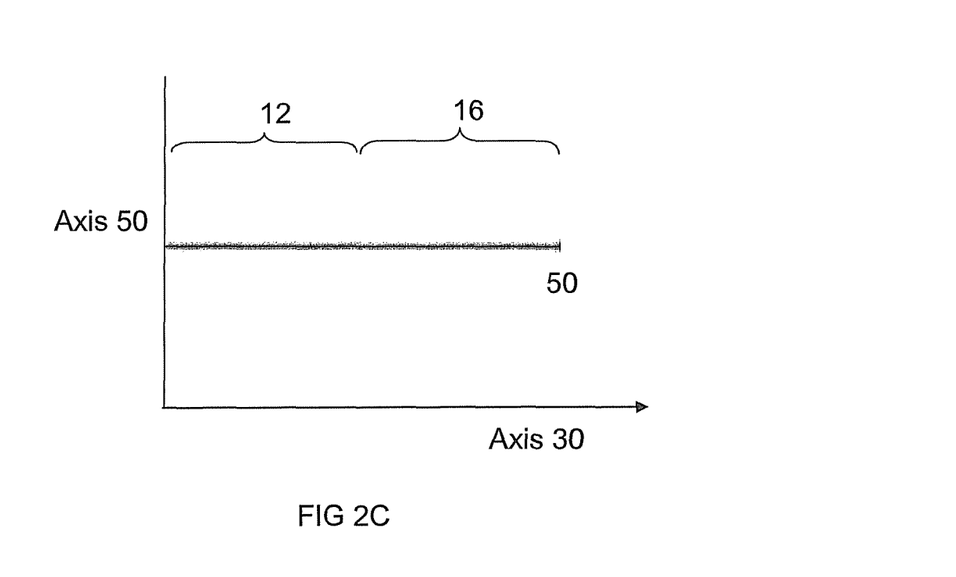
FIG. 2C shows a schematic graph of the mean size of carbide grains within an embodiment of a hard-metal body as a function of depth from a surface.

With reference to FIG. 2C, the mean tungsten carbide grain size 50 of an embodiment of a hard-metal body is plotted on a schematic graph of hardness Axis 50 versus depth from a surface Axis 30 of the body. The mean grain size 50 of tungsten carbide grains does not vary more than about 5 percent between the surface region 12 and the core region 16.

Figure 2D:
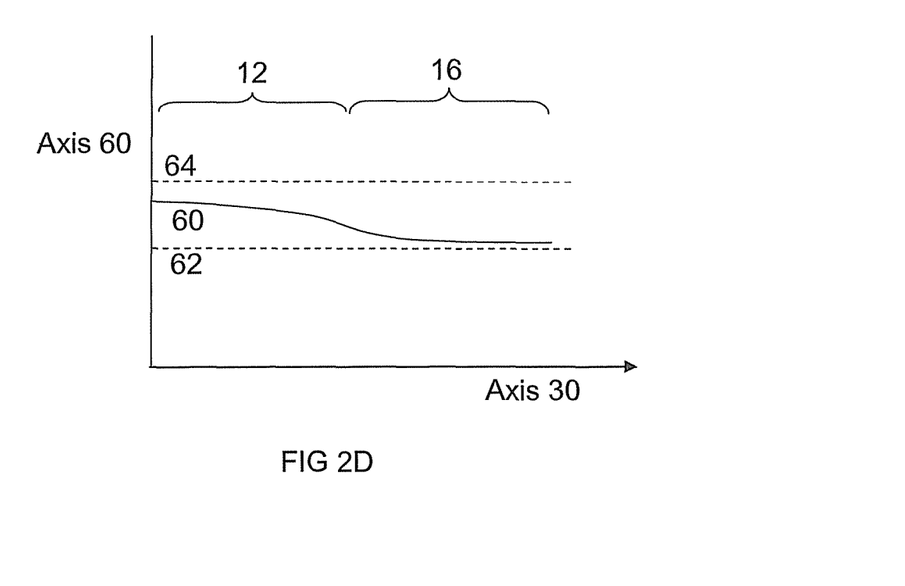
FIG. 2D shows a schematic graph of the carbon content within an embodiment of a hard-metal body as a function of depth from a surface.

With reference to FIG. 2D, the mean tungsten carbide grain size 60 of an embodiment of a hard-metal body is plotted on a schematic graph of hardness Axis 60 versus depth from a surface Axis 30 of the body. The mean carbon content 60 generally decreases with increasing depth Axis 30 from the surface through the surface region 12 and the core region 16, the mean carbon content within the surface region 12 being greater than the mean carbon content in the core region 16. The mean carbon content in the surface region 12 is less than the level of carbon content 64 that would result in free carbon within the binder, and that in the core region 16 is greater than the level of carbon content 62 that would result in the formation of eta-phase. The surface region 12 and the core region 16 are substantially devoid of eta-phase and free carbon.

Figure 3:
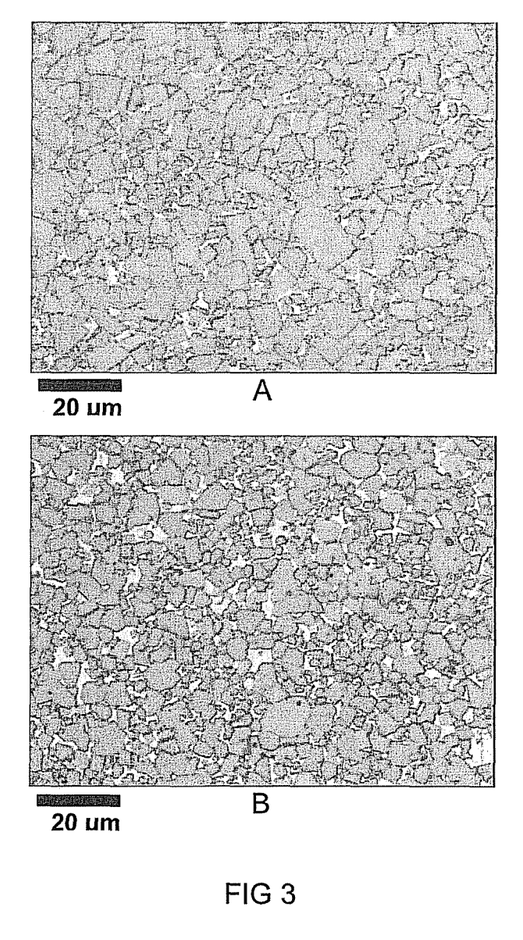
FIG. 3 shows optical micrographs of an embodiment of a hard-metal body, micrograph (A) showing the microstructure in the surface region and micrograph (B) showing the microstructure in the core region.
Figure 4A:
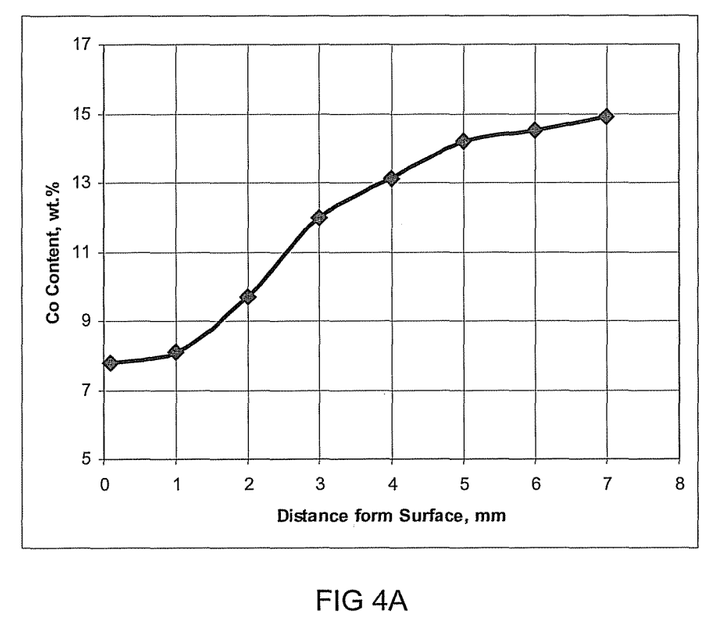
FIG. 4A shows a graph of the distribution of Co content within an embodiment of a hard-metal body as a function of depth from the surface.
Figure 4B:
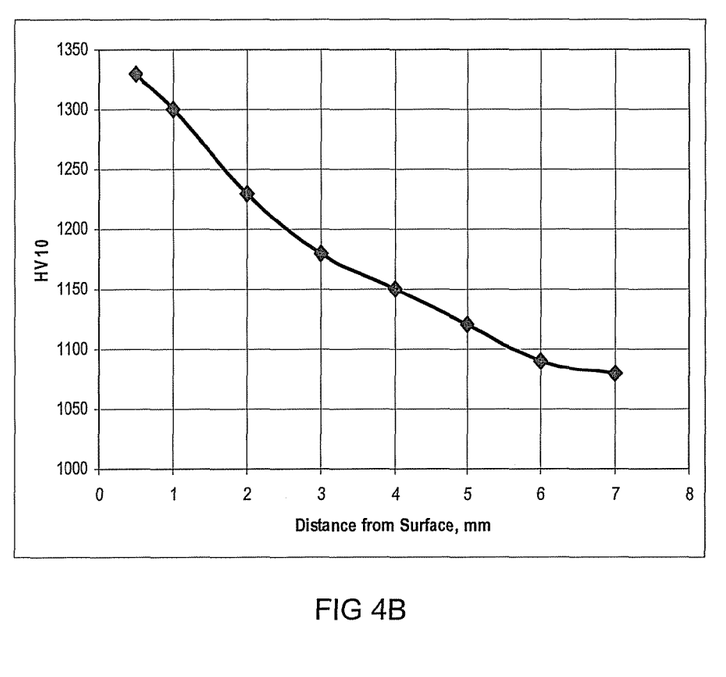
FIG. 4B shows a graph of the distribution of Vickers hardness within an embodiment of a hard-metal body as a function of depth from the surface.

With reference to FIG. 3A and FIG. 3B, the mean size of WC grains within the surface region of the a hard-metal body is substantially the same as that within the core region. The white portions of the micrographs represent the WC grains and the black portions representing cobalt binder.

The magnetic properties of the hard-metal comprising cobalt-cemented tungsten carbide (WC—Co) can be related to structural and compositional characteristics, including the content of carbon present in the binder. As is well known in the art, the content of carbon within the binder of WC—Co can be measured indirectly, by measuring the concentration of tungsten dissolved in the binder to which it is indirectly proportional: the higher the content of carbon dissolved in the binder the lower the concentration of tungsten dissolved in the binder. The tungsten content within the binder can be determined from a measurement of the magnetic moment, $\sigma$ or magnetic saturation, $\mu=4\pi\sigma$, these values having an inverse relationship with the tungsten content (Roebuck (1996), "Magnetic moment (saturation) measurements on hard-metals", *Int J. Refractory Met.*, Volume 14, pp. 419-424.).

The binder cobalt content within a hard-metal can be measured by various methods well known in the art, including indirect methods such as such as the magnetic properties of the hard-metal or more directly by means of EDX, but the most accurate method is based on chemical leaching of Co. The mean grain size of carbide grains, such as WC grains, can be determined by examination of SEM (scanning electron micrographs) or light microscopy images of metallurgically prepared cross-sections of a hard-metal body, applying the mean linear intercept technique, for example. Alternatively, the mean size of the WC grains can be measured indirectly by measuring the magnetic coercivity of the hard-metal, which indicates the mean free path of Co intermediate the grains, from which the WC grain size may be calculated using a simple formula well known in the art. This formula quantifies the inverse relationship between magnetic coercivity of a Co-cemented WC hard-metal and the Co mean free path, and consequently the mean WC grain size.

Several phases comprising tungsten (W), cobalt (Co) and carbon (C) are known and are typically designated by Greek letters. An eta-phase composition is understood herein to mean a carbide compound having the general formula $M_xM'_yC_z$, where M is at least one element selected from the group consisting of W, Mo, Ti, Cr, V, Ta, Hf, Zr, and Nb; M' is at least one element selected from the group consisting of Fe, Co, Ni, and C is carbon. Where M is tungsten (W) and M' is cobalt (Co), as is the most typical combination, then eta-phase is understood herein to mean $Co_3W_3C$ (eta-1) or $Co_6W_6C$ (eta-2), as well as fractional sub- and super-stochiometric variations thereof. There are also some other phases in the W—Co—C system, such as theta-phases $Co_3W_6C_2$, $Co_4W_4C$ and $Co_2W_4C$, as well as kappa-phases $Co_3W_9C_4$ and $CoW_3C$ (these phases are sometimes grouped in the literature within a broader designation of eta-phase).

A method for making an embodiment of a hard-metal body includes the following steps:
1. Preparing a green body comprising WC and Co powder by a suitable method, as is known in the art, ensuring that the carbon content is low, but nevertheless above the level that would result in the formation of eta-phase. The low carbon content may be in the range from about 95 percent to about 99 percent of the stoichiometric content and depends on the cobalt content within the hard-metal as well as other factors, such as the carbon potential in the sintering furnace, as would be appreciated by the person skilled in the art.

2. Subjecting the unsintered green body to pre-sintering heat treatment in a vacuum, inert or protective atmosphere for a period of time to form a pre-sintered body. It is important that the temperature is sufficiently low (less than about 1,280 degrees centigrade) not to result in the cobalt binder melting, but sufficiently high (higher than 1,000 degrees centigrade) to partially close the porosity of the green body. The combination of temperature and time is selected with the aim of maintaining a certain desired open porosity within the surface region of the pre-sintered body. Open porosity permits gas to permeate the body at a rate depending on the structure and amount of open porosity and the gas pressure, which should be in the range from 1 to 2 bars. A porous pre-sintered body that has been subjected to the pre-sinter heat treatment has a certain desired open porosity. The pre-sintering heat treatment temperature versus time cycle that will result in the required porosity is best determined empirically, by trial and error, since it depends on various factors, such as the cobalt fraction and the desired depth of gas permeation, and consequently the thickness of the surface region.
3. Subjecting the porous pre-sintered body to a further heat treatment for a time period within a carbon-containing atmosphere selectively to carburise its surface region. The gas pressure should be in the range from about 1 to 2 bars. It is again important that the temperature is sufficiently low not to result in the cobalt binder melting, i.e. the temperature must be less than about 1,280 degrees centigrade. The carbonaceous gas is allowed to permeate the body through the open pores, the depth of permeation being controlled by the time period. After this carburisation stage, the carburised surface region having a carbon content of 101 percent to 105 percent of the stoichiometric content is formed within porous body and contains carbon, the amount of carbon being highest near the surface from which it permeated and diffused, decreasing monotonically with depth into the body.
4. After the carburisation stage, sintering the body at a temperature above 1,320 degrees centigrade, as is known in the art, but below 1,400 degrees centigrade. During this sintering stage, the cobalt liquefies and fills the pores, and carbon diffuses from the surface region towards the core region owing to the carbon gradient. The temperature and time combination used for liquid phase sintering is chosen to achieve a certain desired rate of dissolution and re-precipitation of fine WC grains in the surface and core regions, as is known in the art. The sintering temperature must not exceed 1,400 degrees centigrade in order to prevent elimination of carbon gradient and consequently the different concentrations of W dissolved in the binder of the surface and core regions and the corresponding difference in magnetic moment between the surface region and core region. At higher sintering temperatures an equilibrium carbon and consequently tungsten concentration dissolved in the binder is obtained.

While wanting not to be bound to a particular hypothesis, it is believed that the method exploits a known phenomenon called "cobalt drift", in which liquid cobalt within a hard-metal being sintered tends to migrate in the same direction in which carbon moves. The movement of cobalt than therefore be controlled by setting up a carbon gradient and allowing the carbon to diffuse from a region of high concentration to one of low concentration. This movement of cobalt can be promoted by another well-known possible mechanism that is associated with the fact that low carbon content tends to result in finer WC grain size, which results in higher capillary forces in the region of low carbon and the consequent migration of liquid cobalt into that region.

The person skilled in the art would appreciate that the carbon and tungsten content in the binder can be controlled within variants of this method. Since it may be difficult to measure the carbon content directly, a trial and error approach may be the best for adapting the method parameters to achieve magnetic moment values within the claimed ranges.

Embodiments of the method have the advantage that the carbon may permeate the hard-metal to a substantial depth in a regulated way owing to the controlled open porosity, and consequently the avoidance of eta-phase in the core as well as the avoidance of free carbon in the surface region.

Another advantage is that the cobalt contents of the surface and core regions are controlled by means of carbon levels and by engineering the WC mean grain size in the surface and core regions. This avoids the need to introduce locally a grain growth inhibitor, which is technically very difficult and which would tend to reduce the fracture toughness.

Embodiments of the method of the invention have the advantage that an additional step of applying the grain growth inhibitors or their precursors to a surface of hard-metal green bodies prior to liquid phase sintering is avoided. The green bodies are extremely brittle, which makes this step very difficult or even impossible for bodies having a complex shape, and so the invention is particularly advantageous where the hard-metal body has relatively complex shape.

It has surprisingly been found that if a hard-metal body comprises a surface region with a lower binder content, higher carbon content and lower concentration of tungsten dissolved in the binder phase, the hardness-toughness coefficient of the surface region can be significantly increased leading to a dramatic improvement in wear-resistance. This occurs as a result of the fact that the high residual tensile stresses, typically present in the binder phase of WC—Co hard-metals, becomes significantly lower in the surface region of the gradient hard-metal body or even becomes compressive. This phenomenon is believed to be related to the different shrinkage rates in the surface and core regions achieved by the different cobalt and carbon contents as well as different concentrations of tungsten dissolved in the binder of these two regions. The higher carbon content and lower concentration of tungsten dissolved in the binder of the surface region correspond to its higher magnetic moment compared to the core region.

Residual stress within the surface region of an embodiment of a hard-metal body arises as a result of the shrinkage of the core region during solidification of liquid binder after sintering being significantly greater than that of the surface region. Since the concentration of W dissolved in the binder is related to the magnetic moment of the binder, the desired residual stresses and consequently the high hardness-toughness coefficient in the surface region are achieved when the magnetic moment of the surface layer is higher than about 0.140X and that of the core region is lower than about 0.140Y. As before, X and Y are the cobalt binder fractions in weight percent within the surface and core regions, respectively. Correspondingly, the concentration of W dissolved in the binder of the surface region is less than about 7.6 weight percent and that in the binder of the core region is greater than about 7.6 weight percent.

Free carbon arises when the magnetic moment of the surface region is greater than the upper limit 0.161X, indicating that the concentration of W dissolved in the binder is about 0. The free carbon results in a dramatic decrease of both hardness and fracture toughness of the surface region. When the magnetic moment of the surface region is lower than the lower limit 0.140X, indicating that the concentration of W dissolved in the binder becomes equal to or higher than about 7.6 weight percent, the high toughness-hardness coefficient mentioned previously may not be achieved. This may be as a result of higher brittleness of the surface region at relatively high concentrations of dissolved tungsten and may also be related to the fact that the rate of shrinkage of the surface region becomes too high.

When the magnetic moment of the core region is lower than the lower limit 0.110Y, indicating that the concentration of tungsten dissolved in the binder is higher than about 18.5 weight percent, there is a risk of formation of the brittle eta-phase leading to a noticeable decrease of the hard-metal fracture toughness. When the magnetic moment of the surface region is higher than the lower limit 0.140Y, indicating that the concentration of tungsten dissolved in the binder becomes equal to or less than about 7.6 weight percent, the desired high toughness-hardness coefficient of the surface region may not be achieved. This may be related to the fact that the rate of shrinkage of the core region becomes too low in comparison with the surface region.

EXAMPLES

Embodiments of the invention are described in more detail with reference to the examples below, which are not intended to limit the invention.

Example 1

Tungsten carbide powder was blended with Co powder and W powder to provide a powder blend comprising 89 weight percent WC, 1 weight percent W and 10 weight percent Co. The WC grains had a mean size of about 4.5 microns and carbon content of 6.13 weight percent, the Co grains had a mean size of about 1 micron and the W grains had a mean size of about 0.8 microns. The blend was produced by milling the powders together for 24 hours by means of a ball mill in a milling medium comprising hexane with 2 weight percent paraffin wax, and using a powder-to-ball ratio of 1:6.

The powder blend was dried and compacted to form green bodies having semi-spherical domes, which were then and heat-treated in vacuum at 1,000 degrees centigrade for one hour to form porous pre-sintered bodies. The porous pre-sintered bodies were then heat-treated at 800 degrees centigrade for one hour in an atmosphere of hydrogen with 6.5 volume percent methane to form carburised pre-sintered bodies in which the surface regions were carburised. The carburised pre-sintered bodies were then sintered at 1,370 degrees centigrade for 75 min, including a 45 minute vacuum sintering stage and a 30 minute high isostatic pressure (HIP) sintering stage carried out in an argon atmosphere at a pressure of 50 bars. Sintered hard-metal inserts having diameter of 14 mm and a height of nearly 20 mm were thus produced. Radial cross-sectional surfaces of the hard-metal inserts were prepared for analysis by cutting 3 mm thick discs from the centres of the inserts and then polishing the cross-sectional surfaces according to the standard metallurgical procedure. The microstructure of the polished cross-sections was examined by optical microscopy. The disk was substantially devoid of observable free carbon or eta-phase. The average WC grain size in the surface and core regions was analysed using the mean linear intercept method.

In order to measure the cobalt fraction within the surface and core regions, two rings with thickness of 1 mm and 3 mm were cut from the disk. In this example, the cobalt fraction is identical to the binder fraction since the binder is substantially all cobalt. The outer-most ring corresponded to the surface region and the inner ring to an outer portion of the core region. The remaining disc with a diameter of roughly 6 mm corresponded to the inner bulk of the core region. The rings and disc were examined by various methods, including chemical leaching of Co. The values of the specific magnetic saturation SMS (the percentage of magnetic saturation in comparison with that of nominally pure Co) were also calculated. The results are presented in Table 1. Since the concentration of carbon within the cobalt binder is positively related to the specific magnetic saturation (SMS), as is well known in the art, the latter gives an indication of the relative carbon concentrations in the binder within the regions. The concentration of tungsten dissolved in the binder was determined as $(16.1-\sigma_B)/0.275$; $\sigma_B$ being the magnetic moment of the hard-metal within a region of the hard-metal body divided by the binder weight fraction in the region.

In this example the carbon content decreases with depth from the surface, indicated by the fact that the specific magnetic saturation decreases with depth from the surface. No eta-phase was detectable within any portion of the hard-metal. The residual stress measurement was performed on the (200) peak of fcc (face centered cubic) Co by use of the Brucker D8 Discover diffractometer. The standard iso-inclination $\sin^2 \psi$ method was employed for calculation of residual stresses. The residual stress in the surface region was found to be tensile and equal to 220 MPa.

Drill bits for a laboratory test in percussion drilling of quartzite were produced using the inserts. The wear of the inserts in the test was indicated by the gauge wear. The test was carried out by use of a conventional drilling rig operating at the following parameters: blow energy—200 J, torque—250 Nm, blow frequency—2700 bl./min, rotation speed—75 rev/min; axial blow force—10000 N, pressure of compression air—50 N/cm$^2$, flow rate of cooling water—35 l/min. As controls, drill bits were also produced with inserts of conventional WC—Co hard-metals containing 10 weight percent Co without gradient carbon and Co content, which were manufactured from the same WC powders as the test inserts, but using conventional fabrication conditions. These control inserts had the following properties: the magnetic coercivity Hc was 95 Oe; the magnetic moment was 1.2 µTm$^3$/kg; the Vickers hardness HV10 was 1,200, and the Palmquist fracture toughness was 14.6 MPa m$^{1/2}$. After drilling 3 m of quartzite the test inserts had a gauge loss of 0.2 mm whereas the inserts of the conventional hard-metals has a gauge loss of 1.1 mm. Thus, the wear-resistance of the inserts with gradient carbon and Co content was more than 5 times higher than that of the conventional inserts.

TABLE 1

|  | Surface region | Outer portion of core region | Inner portion of core region |
| --- | --- | --- | --- |
| Depth from surface, mm | 0-1 | 1-4 | >4 |
| Magnetic moment, s, µTm$^3$/kg | 1.32 | 1.56 | 1.9 |
| Magnetic saturation, 4 ps, µTm$^3$/kg | 16.58 | 19.59 | 23.86 |
| Specific magnetic saturation, SMS, percent | 93.2 | 82.1 | 85.5 |
| Concentration of W dissolved in binder, weight | 4.0 | 10.5 | 8.4 |

TABLE 1-continued

|  | Surface region | Outer portion of core region | Inner portion of core region |
|---|---|---|---|
| Cobalt content (binder fraction), weight percent | 8.8 | 11.8 | 13.8 |
| Magnetic coercivity, Hc, Oe | 115 | 104 | 92 |
| Average Vickers hardness, $HV_{10}$ | 1330 | 1200 | 1110 |
| Mean equivalent diameter of carbide grains, $D_{wc}$, μm | 2.9 | 2.8 | 2.8 |
| Fracture toughness, $K_{1C}$ MPa·$m^{1/2}$ | 17.8 | 15.0 | 16.3 |
| Hardness-toughness coefficient | 23674 | 18000 | 18093 |
| Residual stress in binder, MPa | 220 | — | — |

The invention claimed is:

1. A method of making a hard-metal body, the method including the steps of:

pre-sintering an unsintered green body at a temperature in the range from 1,000 degrees centigrade to 1,280 degrees centigrade for a period of time in the range from 1 hour to 3 hours in a vacuum or inert atmosphere to form a pre-sintered body, the temperature being sufficiently low to avoid substantial melting of the metal binder and the temperature and time being sufficient to maintain open porosity within the surface region of green body, to form a pre-sintered body having open porosity within the surface region of the pre-sintered body, wherein the unsintered green body comprises grains of metal carbide dispersed within a metal binder and a carbon content in the range from 95 percent to 99 percent of the stoichiometric content of carbon in the presence of the hard metal in the metal binder;

heat-treating the pre-sintered body in a carbon-containing atmosphere to form a carburised surface region having a carbon content in the range from 101 percent to 105 percent of the stoichiometric content; and liquid-phase sintering the pre-sintered body at a temperature in the range from 1,320 degrees centigrade to 1,400 degrees centigrade to form the hard-metal body.

2. The method according to claim 1, wherein the method is carried out in the absence of a grain-growth inhibitor or precursor thereof being applied to a surface of the green body or the pre-sintered body prior to the liquid-phase sintering step.

3. The method according to claim 1 wherein the hard-metal body comprises a hard-metal, the hard-metal comprising tungsten carbide grains and metal binder comprising cobalt having a concentration of tungsten dissolved therein, and the body comprises a surface region adjacent a surface and a core region remote from the surface, the surface region and the core region being contiguous with each other;

the mean binder fraction of the core region being greater than that of the surface region; the mean carbon concentration within the binder being higher in the surface region than in the core region; and the mean magnetic moment of the hard-metal in the surface region being greater than that in the core region; the hard-metal body being substantially devoid of eta-phase and free carbon; and the concentration in weight percent of tungsten dissolved in the binder in the surface region being less than that in the core region, the concentration in weight percent of tungsten dissolved in the binder being determined as $(16.1-\sigma_B)/0.275$; $\sigma_B$ being the magnetic moment of the hard-metal within a region of the hard-metal body divided by the binder weight fraction in the region.

* * * * *